United States Patent
Fujinoki et al.

(10) Patent No.: US 7,288,775 B2
(45) Date of Patent: Oct. 30, 2007

(54) SYNTHETIC QUARTZ GLASS OPTICAL MATERIAL FOR YAG LASER WITH HIGHER HARMONIC

(75) Inventors: Akira Fujinoki, Koriyama (JP); Hiroyuki Nishimura, Koriyama (JP); Kunio Yoshida, Neyagawa (JP)

(73) Assignees: Heraeus Quarzglas GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 296 days.

(21) Appl. No.: 10/523,323

(22) PCT Filed: Jul. 19, 2003

(86) PCT No.: PCT/EP03/07914

§ 371 (c)(1),
(2), (4) Date: Feb. 24, 2005

(87) PCT Pub. No.: WO2004/013061

PCT Pub. Date: Feb. 12, 2004

(65) Prior Publication Data

US 2005/0239626 A1    Oct. 27, 2005

(30) Foreign Application Priority Data

Jul. 31, 2002    (JP) ............... 2002-223673

(51) Int. Cl.
  *C03C 3/06*    (2006.01)
  *H01S 3/17*    (2006.01)

(52) U.S. Cl. ............... 250/492.1; 250/492.3; 359/350; 501/53; 501/54

(58) Field of Classification Search ............ 501/53, 501/54; 250/492.1, 492.3; 359/350
See application file for complete search history.

(56) References Cited

U.S. PATENT DOCUMENTS

| 5,086,352 A | * | 2/1992 | Yamagata et al. | ......... 359/350 |
| 5,325,230 A | | 6/1994 | Fabian et al. | |
| 6,143,676 A | | 11/2000 | Ohashi et al. | |
| 2003/0051507 A1 | * | 3/2003 | Ikuta et al. | ......... 65/30.1 |

FOREIGN PATENT DOCUMENTS

| EP | 0 483 752 A2 | 5/1992 |
| EP | 0 483 752 A3 | 5/1992 |
| EP | 1 061 052 A | 12/2000 |
| JP | 2002-087833 A | 3/2002 |
| JP | 2002-87833 A * | 3/2002 |
| WO | WO 97 16382 A | 5/1997 |

OTHER PUBLICATIONS

Patent Abstracts of Japan for JP 2002-087833 published Mar. 27, 2002.

* cited by examiner

*Primary Examiner*—Anthony J. Green
(74) *Attorney, Agent, or Firm*—Tiajoloff and Kelly

(57) ABSTRACT

It is an object of the present invention to provide synthetic quartz glass optical materials suitable for use in YAG of higher order harmonics. The damage threshold value in $J/cm^2$ (energy density at which cracks occur generated by irradiation) is to be considered when synthetic quartz glass material is irradiated with YAG laser of third or higher order harmonics with single pulses or continuously. Regarding a synthetic quartz glass optical material in use for the optical parts constituting the prism and lens used in a laser beam machine, this invention provides a synthetic quartz glass material suitably used for the YAG laser with the third or higher order of harmonic, choosing the following conditions: OH group concentration is in the range of $\geq 1$ to $\leq 300$ ppm; contained hydrogen molecule concentration is in the range of $\geq 2 \times 10^{18}$ to $\leq 2 \times 10^{19}$ molecules/cm³; transmittance of ultraviolet rays at 245 nm of wavelength is 99.9% or more; and the fictive temperature is in the range of $\geq 880$ to $\leq 990°$ C.

11 Claims, 2 Drawing Sheets

SYNTHETIC QUARTZ GLASS OPTICAL MATERIAL FOR YAG LASER WITH HIGHER HARMONIC

TECHNICAL FIELD OF THE INVENTION

The present invention relates to a synthetic quartz glass optical material for use in optical members such as prisms and lenses equipped in a laser-beam processing machine, and it relates to a synthetic quartz glass optical material suitably used for the YAG laser with the third or higher order harmonics.

PRIOR ART

For laser processing such as cutting or perforation of ceramics and metals using laser beams of high power output, carbon dioxide gas laser has been mainly used heretofore. However, with increasing fineness in processing, laser radiations with shorter wavelength are being used. Moreover, in case laser radiations with longer wavelength are used, deterioration due to the heat generated from processed parts was sometimes found to be problematic, and recently, more ultraviolet (UV)-emitting lasers are put into use. Furthermore, processing of plastics is now possible by use of UV lasers.

As the light source of UV laser-beam processing machines, in addition to those employing the higher order harmonics of YAG, known in the art are excimer lasers, for instance, XeCl (308 nm in wavelength) and KrF (248 nm in wavelength). These excimer lasers have advantages as such that they are capable of generating radiations of extremely high power output, and that they enable processing while minimizing damage attributed to heat However, most of them are used in large equipment assembled in a large scale production line, because of the facts as such that the apparatuses are expensive, and that complicated installation is necessary for the assurance of safety and for piping and the like, due to the use of corrosive gases such as chlorine and fluorine. Since YAG laser emitting higher order harmonics is a solid laser, the apparatus can be more simplified as compared with excimer lasers, and requires no gas piping and the like. Accordingly, YAG laser of higher order harmonics is prevailing as a simple apparatus. Moreover, as compared with the excimer lasers above, YAG laser of higher order is also characterized by its low photon cost, and the improvement in wave transformation device makes the laser promising.

YAG laser has its fundamental wavelength at 1064 nm, but the second order harmonics (532 nm), third order harmonics (355 nm), fourth order harmonics (266 nm), fifth order harmonics (212.8 nm) and the like are being used in processing after wave transformation. At present, mainly used are the second and third order harmonics, but in view of higher processing efficiency and smaller deterioration on processing, UV radiations are preferred, and the use of fourth order harmonics is now under consideration for practical use. Preference to fifth order harmonics and to shorter wavelengths is under way.

Higher order harmonics of YAG lasers are also characterized by that their pulse widths can be extremely shortened. At present, radiations with pulse widths ranging from nanoseconds ($10^{-9}$ second) to picoseconds ($10^{-12}$ second) are being used, but it is believed that radiations with pulse widths in the order of femtoseconds ($10^{-15}$ second) will be used in future. By employing light with such short pulse widths, the influence of heat can be eliminated. Thus, in addition to the use of shorter wavelengths, the use of shorter pulses is an important tendency in the art.

Concerning the optical members for use in beam shaping and control of radiations in processing machines using YAG lasers, ordinary optical glasses are sufficient for the fundamentals, however, for the second or higher harmonics, synthetic quartz glass is mainly employed from the viewpoint of durability and transmittance against damages. Such synthetic quartz glasses used in KrF excimer lasers with shorter wavelength have been believed usable as they are, however, problems have been found to occur for the optics used in YAG lasers with the third or higher order harmonics.

In case synthetic quartz glass used in KrF excimer lasers is used as it is in the optics of YAG lasers of third or higher order harmonics, t of causing failures such as the generation of sudden cracks and the like on a quartz glass before generating damages such as the emission of fluorescent light or a change in transmittance. Such cracks suddenly occurring on the optical members not only give damages impossible for repair on optical members such as lenses, but also make the entire apparatus suffer damage due to the generation of an intense scattered light, or is dangerous because, for instance, the scattered light entering human eyes damages the cornea.

In general, the damage generating on the quartz glass (optical damage) due to exposure to ultraviolet (UV) radiations having high energy is a defect denoted as E' center (E-prime center). Since E' centers generate through the destruction of S—O—Si bonds constituting the skeleton of quartz glass by the intense UV radiation and are characterized by a structure having lone pair electron remaining in the Si orbital, they are generally expressed by Si● (dot) and the like, where "●, dot" represents lone pair electron. Since the E' center has an intense optical absorption at 215 nm, an absorption band having a peak at 215 nm is observed on a quartz glass suffering damages by the irradiation of an excimer laser and the like. However, on measuring the UV transmittance characteristics of synthetic quartz glass suffering the generation of cracks attributed to third or fourth order harmonics of YAG, no absorption bands assigned to E' centers were found at the wavelength of 215 nm. In view of such cases, the mechanism of generating cracks in quartz glasses by the higher order harmonics of YAG was found different from the mechanism of generating optical damages on quartz glasses by excimer lasers.

Problems that the Invention is to Solve

In the light of the aforementioned problems, the present inventors extensively conducted studies to develop synthetic quartz glass optical materials suitable for use in YAG of higher order harmonics. Furthermore, it has been found that it is possible to obtain a synthetic quartz glass material safely applicable to YAG laser with the third or higher order harmonics by considering the damage threshold value in case YAG of higher order harmonics is irradiated in single pulses and the damage threshold value in case YAG of higher order harmonics is irradiated continuously. When the YAG laser with the third harmonic with the pulse duration in the range of $\geq 3n$ to $\leq 5n$ seconds is irradiated by single pulse, damage threshold value should be 17 J/cm$^2$ or more, and when the YAG laser with the fourth harmonic with the pulse duration in the range of $\geq 3n$ to $\leq 5n$ seconds is irradiated by single pulse, damage threshold value should be 7 J/cm$^2$ or more. The present invention has been accomplished based on these findings. And when the YAG laser with the third harmonic with the pulse duration in the range of $\geq 3n$ to $\leq 5n$ seconds is irradiated by 12000 pulses continuously, the damage threshold value should be 11 J/cm² or more, and when the YAG laser with the fourth harmonic with the pulse duration in the range of $\geq 3n$ to $\leq 5n$ seconds is irradiated by 12000 pulses continuously, damage threshold value should be 2.5 J/cm² or more.

As a result, optimal ranges were found for OH group concentration, hydrogen molecule concentration, and fictive temperature to be followed by the synthetic quartz glass.

Means for Solving the Problems

In order to solve the problems above, the synthetic quartz glass optical material of the invention which is used in YAG lasers with higher harmonics is a synthetic quartz glass optical material for use in YAG lasers with the third or higher order harmonics, characterized by that it has an OH group concentration in a range of 1 ppm or higher but not higher than 300 ppm, contains hydrogen molecules at a concentration of $2 \times 10^{18}$ molecules/cm³ or higher but not higher than $2 \times 10^{19}$ molecules/cm³, has a transmittance of 99.9% or higher for ultraviolet radiation 245 nm in wavelength, and has a fictive temperature in a range of 880° C. or higher but not higher than 990° C.

The concentration of chlorine contained in the synthetic quartz glass optical material above is not particularly limited, but it is preferably 20 ppm or lower.

The synthetic quartz glass optical material above is used suitably for YAG lasers with higher order harmonics in the range of from the third to the fifth harmonics.

In the synthetic quartz glass optical material above, in case single pulse of YAG laser of the third order harmonics is irradiated at a pulse width of 3 ns ($10^{-9}$ second) or longer but not longer than 5 ns, the damage threshold value is 17 J/cm² or higher, and in case single pulse of YAG laser of the fourth order harmonics is irradiated at a pulse width of 3 ns or longer but not longer than 5 ns, the damage threshold value is 7 J/cm² or higher.

In the synthetic quartz glass optical material above, in case YAG laser of the third order harmonics is irradiated continuously for 12000 pulses at a pulse width of 3 ns or longer but not longer than 5 ns, the damage threshold value is 11 J/cm² or higher, and in case YAG laser of the fourth order harmonics is irradiated continuously for 12000 pulses at a pulse width of 3 ns or longer but not longer than 5 ns, the damage threshold value is 2.5 J/cm² or higher.

The synthetic quartz glass optical material above can be favorably used for YAG lasers emitting third harmonics with an energy density of 11 J/cm² or lower, a pulse width of 3 ps ($10^{-12}$ second) or longer but not longer than 5ns, and at an oscillation frequency of 10 Hz or higher but not higher than 20 KHz.

The synthetic quartz glass optical material above can be favorably used for YAG lasers emitting fourth harmonics with an energy density of 2.5 J/cm² or lower, a pulse width of 3 ps or longer but not longer than 5 ns, and at an oscillation frequency of 10 Hz or higher but not higher than 20 KHz.

Mode for Carrying Out the Invention

Modes for carrying the present invention are explained below, but it should be understood that these embodiments are shown only for examples and that various modifications are possible so long as they do not depart from the technological concept and idea of the present invention.

The synthetic quartz glass optical material for YAG lasers with higher order harmonics according to the present invention should be used with the OH group concentration ranging of 1 ppm or higher but 300 ppm or lower. Concerning the relation between the OH group concentration and the threshold value of laser damage, the damage threshold value increases with lowering OH group concentration. However, in case the OH group concentration is too low, for instance, in case it becomes lower than 1 ppm, defects of oxygen defective type tend to develop, and is therefore not preferred. Since the quantity of the defects of oxygen defective type is expressed by the UV transmittance for the radiation 245 nm in wavelength, it is sufficient if this value is 99.9% or higher. However, by taking the likelihood of generating oxygen defects, the OH group concentration is 1 ppm or higher, and preferably, 5 ppm or higher. In case the OH group concentration exceeds 300 ppm, on the other hand, the damage threshold value becomes relatively too high, the upper limit of the OH group concentration is preferably 300 ppm or lower, and more preferably, 50 ppm or lower.

In the present invention, the concentration of hydrogen molecules is in a range of from $2 \times 10^{18}$ molecules/cm³ or higher but not higher than $2 \times 10^{19}$ molecules/cm³, and preferably, in a range of from $4 \times 10^{18}$ molecules/cm³ or higher but not higher than $8 \times 10^{18}$ molecules/cm³. Concerning the damage threshold value, it is necessary that the hydrogen molecule concentration is $2 \times 10^{18}$ molecules/cm³ or higher. However, the effect seems to be saturated at concentrations of $1 \times 10^{19}$ molecules/cm³ or higher. In case hydrogen molecules are incorporated at high concentration, a hydrogen treatment at pressures as high as 100 atm or higher is necessary in order to maintain hydrogen molecules at high concentration, and there occur problems concerning safety, or there generate industrial disadvantages such as that the quartz glass show high birefringence (e.g., that the birefringence exceeds 5 nm/cm) due to the treatment of quartz glass under atmosphere of high pressure.

With respect to fictive temperature, it is set in a range of 880° C. or higher but not higher than 990° C. In order to set the fictive temperature to lower than 880° C., cooling at a considerably low rate (for instance, 0.5° C./hour) Us necessary, and this leads to problems such as the generation of drop in transmittance ascribed to the contamination from the furnace.

EXAMPLES

The present invention is explained in further detail below by making reference to Examples, but it should be understood that these embodiments are simply given as examples, and are by no way limiting the invention.

Examples 1 to 3

A porous quartz glass body (soot body) was obtained by introducing high purity silicon tetrachloride in an oxyhydrogen flame, and by then depositing the fine silica powder thus obtained by flame hydrolysis on a rotating base body. The soot body was heated under He atmosphere at 1150° C. for 20 hours to accelerate the sintering of fine silica particles to uniformly increase the density thereof, and was then vitrified to obtain a transparent glass body by further heating it at 1500° C. for 10 hours in vacuum furnace at 0.01 hPa (hecto Pascals) or lower to prepare about 2.5 kg of transparent quartz glass ingot 70 mm in diameter and 300 mm in length.

The thus obtained synthetic quartz glass ingot was homogenized along one direction by zone melting method described below. More specifically, after welding support tubes of synthetic quartz to both ends of the ingot, the ingot was clamped with a lathe by the supports, and a melting zone was formed by heating a part of the ingot using an oxyhydrogen burner. Then, while applying differential rotary movement to both chucks of the lathe to stir inside the melting zone, the burner was moved to homogenize the entire ingot. After homogenization, the ingot was shaped into a barrel type, cut from the support tubes, and set inside a graphite mold 170 mm in inner diameter and 100 mm in height to heat the whole mold at 1800° C. to obtain a quartz glass mold body 170 mm in diameter and 40 mm in thickness.

In order to remove the contaminated part, the quartz glass mold body was cut for a thickness of 5 mm from the outer peripheral portion that was brought into contact with graphite. Thus was obtained a mold body 160 mm in outer diameter and 30 mm in thickness, which was held for 20 hours at 1150° C. in atmospheric furnace, and then gradually cooled to 600° C. at a rate of 2° C. per hour. The power source of the furnace was cut at that moment to cool the molding to room temperature (mold body (1)).

On performing purity analysis on the thus obtained synthetic quartz glass mold body by means of ICP mass spectrometer, it was found to contain 10 ppb in total of alkali metal elements of Na, Li, and K, 5 ppb or less in total of alkaline earth elements of Mg and Ca, and 5 ppb or less in total of other metallic elements of Fe, Cu, Ni, Ti, and Cr.

Four quartz glass disks each 60 mm in diameter and 30 mm in thickness were cut out from the synthetic quartz glass mold body, and hydrogen doping was performed on three of them by placing one each under high pressure atmosphere of hydrogen at 20 atm (Example 1), 40 atm (Example 2), and 60 atm (Example 3), respectively, and heating them at 400° C. for 3 weeks.

Comparative Example 1

Furthermore, the fourth quartz glass disk cut out from the mold body (1) above was subjected to hydrogen doping in a manner similar to Example 1, except for changing the hydrogen pressure to 2 atm.

Example 4

A porous quartz glass body (soot body) was obtained by introducing high purity silicon tetrachloride in an oxyhydrogen flame, and by then depositing the fine silica powder thus obtained by flame hydrolysis on a rotating base body. The soot body was vitrified by heating under He atmosphere at 1500° C. for 10 hours to obtain about 2.5 kg of transparent quartz glass ingot 70 mm in diameter and 300 mm in length. After performing homogenization in one direction by zone melting in a manner similar to that described in Examples 1 to 3, the ingot was set inside a graphite mold 170 mm in inner diameter and 100 mm in height to heat the whole mold at 1800° C. Thus was obtained a quartz glass mold body 170 mm in diameter and 40 mm in thickness.

In order to remove the contaminated part, the quartz glass mold body was cut for a thickness of 5 mm from the outer peripheral portion that was brought into contact with graphite. Thus was obtained a mold body 160 mm in outer diameter and 30 mm in thickness, which was held for 20 hours at 1150° C. in atmospheric furnace, and then gradually cooled to 600° C. at a rate of 2° C. per hour. The power source of the furnace was cut at that moment to cool the molding to room temperature (mold body (2)). Three quartz glass disks each 60 mm in diameter and 30 mm in thickness were cut out from the synthetic quartz glass mold body, and hydrogen doping was performed on one of them by placing it in a furnace maintained under high pressure atmosphere of hydrogen at 40 atm at a temperature of 400° C. for 3 weeks.

Comparative Example 2

Another quartz glass disk cut out from the mold body (2) was held at 1150° C. in the atmosphere for 20 hours, and was cooled to 600° C. at a rate of 20° C. per hour. The power source of the furnace was cut at that moment to cool the molding to room temperature. The quartz glass disk was then placed in a furnace maintained under high pressure atmosphere of hydrogen at 40 atm at a temperature of 400° C. for 3 weeks to perform hydrogen doping.

Comparative Example 3

A porous quartz glass body (soot body) was obtained by introducing high purity silicon tetrachloride in an oxyhydrogen flame, and by then depositing the fine silica powder thus obtained by flame hydrolysis on a rotating base body. The soot body was subjected to dehydration treatment by heating it at 800° C. for 20 hours under a mixed gaseous atmosphere containing 10 vol % of chlorine and 90 vol % He, and was vitrified by heating under He atmosphere at 1500° C. for 10 hours to obtain about 2.5 kg of transparent quartz glass ingot 70 mm in diameter and 300 mm in length. After performing homogenization in one direction on the thus obtained synthetic quartz glass ingot by zone melting in a manner similar to that described in Examples 1 to 3, the ingot was set inside a graphite mold 170 mm in inner diameter and 100 mm in height to heat the whole mold at 1800° C. Thus was obtained a quartz glass mold body 170 mm in diameter and 40 mm in thickness.

In order to prevent contamination from occurring, the quartz glass mold body was cut for a thickness of 5 mm from the outer peripheral portion that was brought into contact with graphite. Thus was obtained a mold body 160 mm in outer diameter and 30 mm in thickness, which was held at 1150° C. for 20 hours in atmospheric furnace, and then gradually cooled to 600° C. at a rate of 2° C. per hour. The power source of the furnace was cut at that moment to cool the molding to room temperature (mold body (3)). A quartz glass disk 60 mm in diameter and 30 mm in thickness was cut out from the synthetic quartz glass mold body, and hydrogen doping was performed on one of them by placing it in a furnace maintained under high pressure atmosphere of hydrogen at 40 atm at a temperature of 400° C. for 3 weeks.

Comparative Example 4

An about 2.5 kg of transparent quartz glass ingot 70 mm in diameter and 300 mm in length was obtained by introducing high purity silicon tetrachloride in an oxyhydrogen flame, and by then depositing while melting the fine silica powder obtained by flame hydrolysis on a rotating base body. Thus was obtained. After performing homogenization in one direction on the thus obtained synthetic quartz glass ingot by zone melting in a manner similar to that described in Examples 1 to 3, the ingot was set inside a graphite mold 170 mm in inner diameter and 100 mm in height to heat the whole mold at 1800° C. Thus was obtained a quartz glass mold body 170 mm in diameter and 40 mm in thickness.

In order to prevent contamination from occurring, the quartz glass mold body was cut for a thickness of 5 mm from the outer peripheral portion that was brought into contact with graphite. Thus was obtained a mold body 160 mm in outer diameter and 30 mm in thickness, which was held at 1150° C. for 20 hours in atmospheric furnace, and was then gradually cooled to 600° C. at a rate of 2° C. per hour. The power source of the furnace was cut at that moment to cool the molding to room temperature (mold body (4)). A quartz glass disk 60 mm in diameter and 30 mm in thickness was cut out from the synthetic quartz glass mold body, and hydrogen doping was performed on one of them by placing it in a furnace maintained under high pressure atmosphere of hydrogen at 40 atm at a temperature of 400° C. for 3 weeks.

The OH group concentration, hydrogen molecule concentration, chlorine concentration, fictive temperature, and transmittance for UV radiation 245 nm in wavelength for the synthetic quartz glass bodies thus obtained are given in Table 1. Measurements were made on the OH group concentration by infrared spectroscopy, hydrogen molecule concentration by laser Raman spectroscopy, chlorine concentration by fluorescent X-ray analysis, fictive temperature by laser Raman spectroscopy, and UV transmittance by ultraviolet spectroscopy.

comprises sensing a part of the optical energy absorbed by the quartz glass sample in case laser radiation passes the sample, which is converted to acoustic energy, by means of an AE sensor (acoustic emission sensor) 20, then converting it to electric energy, and the voltage signal amplified with an amplifier 22 is observed with an oscilloscope 24 as voltage waveform. In case damage occurs on the quartz glass sample, an extremely large acoustic energy different from the ordinary state generates as to show the generation of damage at high sensitivity. After irradiation, the cracks generated on the quartz glass can be observed under the microscope.

1) Damage Threshold Value by Irradiating Third Order Harmonics in Single Pulse

Third order harmonics of YAG was irradiated in single pulses to each of the samples, and the energy density at which fine cracks generate on the quartz glass was measured. The results are given in Table 2 and FIG. 1. The damage threshold value in the table shows the energy density per pulse in J/cm$^2$ unit, at which cracks generated on the quartz glass by irradiation.

TABLE 1

|  | OH group concentration | Hydrogen molecule concentration | Chlorine concentration | Fictive temperature | Transmittance for radiation 245 nm in wave length |
|---|---|---|---|---|---|
| Example 1 | 30 ppm | $4 \times 10^{18}$ mole/cm$^3$ | 8 ppm | 940° C. | 99.9% |
| Example 2 | 30 ppm | $8 \times 10^{18}$ mole/cm$^3$ | 8 ppm | 940° C. | 99.9% |
| Example 3 | 30 ppm | $1.2 \times 10^{19}$ mole/cm$^3$ | 8 ppm | 940° C. | 99.9% |
| Example 4 | 200 ppm | $8 \times 10^{18}$ mole/cm$^3$ | 5 ppm | 930° C. | 99.9% |
| Comparative Example 1 | 30 ppm | $4 \times 10^{17}$ mole/cm$^3$ | 8 ppm | 940° C. | 99.9% |
| Comparative Example 2 | 200 ppm | $8 \times 10^{18}$ mole/cm$^3$ | 5 ppm | 1010° C. | 99.9% |
| Comparative Example 3 | 0 ppm | $8 \times 10^{18}$ mole/cm$^3$ | 200 ppm | 950° C. | 98.2% |
| Comparative Example 4 | 600 ppm | $1 \times 10^{19}$ mole/cm$^3$ | 80 ppm | 910° C. | 99.9% |

Laser Damage Test

Irradiation test using higher order harmonics of YAG laser was performed on the specimens prepared above. Schematically drawn explanatory drawing of the YAG laser damage test apparatus is shown in FIG. 2. Referring to FIG. 2, the damage test on quartz glass using higher order harmonics of YAG laser comprises converting fundamentals irradiated from YAG laser 10 into the third or fourth order harmonics using two wavelength transformation devices 12, 14, and then irradiating the transformed laser radiation to the quartz glass sample 18 in such a manner that it may be focused inside the quartz glass by using a lens 16 having relatively short focus with F=300.

In this manner, the damage (the generation of cracks) of quartz glass is detected by the photo acoustic change caused by the irradiation. The reason why laser radiation is irradiated at a relatively short focus is that, in case irradiation is performed at a relatively long focus, or in an a focal system, self-conversion generates internally due to thermal lens effect as to make the calculation of energy density difficult. Thus, by using a short focus lens, self-conversion is avoided, and more accurate calculation of the irradiated energy density is made possible. The change in transmittance of the quartz glass is detected by photo acoustic measurement. This

TABLE 2

| Sample | Damage threshold value in J/cm$^2$ |
|---|---|
| Example 1 | 17.7 |
| Example 2 | 21.9 |
| Example 3 | 18.9 |
| Example 4 | 17.8 |
| Comparative Example 1 | 15.5 |
| Comparative Example 2 | 16.9 |
| Comparative Example 3 | 14.0 |
| Comparative Example 4 | 16.6 |

As shown in Table 2, favorable results for damage threshold values of 17.7 J/cm$^2$ or higher were obtained in Examples 1 to 4 on irradiating the third order harmonics in single pulses. However, the damage threshold values for Comparative Examples 1 to 4 were 16.9 J/cm$^2$ or lower. FIG. 1 is a graph showing the relation between OH group concentration and the damage threshold values for Example 2 (value with a ●), Example 4 (value with a ▲) and Comparative Example 4 (value with a ■), together with primary regression line. Referring to FIG. 1, in Comparative Example 4 (with OH group concentration of 600 ppm), the damage threshold value was found to be relatively too high as compared with those of Example 2 (with OH group concentration of 30 ppm) and Example 4 (with OH group concentration of 200 ppm).

2) Damage Threshold Value by Irradiating Fourth Order Harmonics in Single Pulse

Fourth order harmonics of YAG was irradiated in single pulses to each of the samples, and the energy density at which fine cracks generate on the quartz glass was measured. The results are given in Table 3.

TABLE 3

| Sample | Damage threshold value in J/cm$^2$ |
|---|---|
| Example 1 | 8.1 |
| Example 2 | 8.8 |
| Example 3 | 8.6 |
| Example 4 | 7.7 |
| Comparative Example 1 | 5.8 |
| Comparative Example 2 | 6.9 |
| Comparative Example 3 | 5.1 |
| Comparative Example 4 | 6.8 |

As shown in Table 3, favorable results of damage threshold values of 7.7 J/cm$^2$ or higher were obtained in Examples 1 to 4 on irradiating the fourth order harmonics in single pulses. However, the damage threshold values for Comparative Examples 1 to 4 were 6.9 J/cm$^2$ or lower.

3) Damage Threshold Value by Continuously Irradiating Third Order Harmonics

Third order harmonics of YAG was irradiated for 12000 pulses at a frequency of 10 Hz to each of the samples, and the energy density at Which fine cracks generate on the quartz glass was measured. The results are given in Table 4.

TABLE 4

| Sample | Damage threshold value in J/cm$^2$ |
|---|---|
| Example 1 | 12.2 |
| Example 2 | 13.0 |
| Example 3 | 12.7 |
| Example 4 | 11.9 |
| Comparative Example 1 | 8.7 |
| Comparative Example 2 | 10.1 |
| Comparative Example 3 | 8.2 |
| Comparative Example 4 | 10.8 |

As shown in Table 4, favorable results for damage threshold values of 11.9 J/cm$^2$ or higher were obtained in Examples 1 to 4 on continuously irradiating the third order harmonics. However, the damage threshold values for Comparative Examples 1 to 4 were 10.8 J/cm$^2$ or lower.

3) Damage Threshold Value by Continuously Irradiating Fourth Order Harmonics

Fourth order harmonics of YAG was irradiated for 12000 pulses at a frequency of 10 Hz to each of the samples, and the energy density at which fine cracks generate on the quartz glass was measured. The results are given in Table 5.

TABLE 5

| Sample | Damage threshold value in J/cm$^2$ |
|---|---|
| Example 1 | 2.9 |
| Example 2 | 3.7 |
| Example 3 | 3.2 |
| Example 4 | 3.0 |

TABLE 5-continued

| Sample | Damage threshold value in J/cm$^2$ |
|---|---|
| Comparative Example 1 | 1.6 |
| Comparative Example 2 | 1.6 |
| Comparative Example 3 | 1.5 |
| Comparative Example 4 | 2.1 |

As shown in Table 5, favorable results of damage threshold values of 2.9 J/cm$^2$ or higher were obtained in Examples 1 to 4 on continuously irradiating the fourth order harmonics. However, the damage threshold values for Comparative Examples 1 to 4 were 2.1 J/cm$^2$ or lower.

4) Long Term Irradiation Test using the Third Harmonics

Continuous irradiation of the third order harmonics of YAG laser was performed by irradiating the samples of Example 1 and Comparative Example 1 each with 10,000,000 pulses at a frequency of 1 kHz, at an energy density of 14 J/cm$^2$, and at a pulse width of 4.5 ns. As a result, no change was observed on the sample of Example 1, but cracks were found to generate on the sample of Comparative Example 1 on irradiating about 10,000 pulses after initiation of the irradiation as to make further irradiation impossible.

5) Long Term Irradiation Test using the Fourth Harmonics

Continuous irradiation of the fourth order harmonics of YAG laser was performed by irradiating the samples of Example 1 and Comparative Example 1 each with 10,000,000 pulses at a frequency of 500 Hz, at an energy density of 2 J/cm$^2$, and at a pulse width of 4 ns. As a result, no change was observed on the sample of Example 1, but cracks were found to generate on the sample of Comparative Example 1 on irradiating about 8,000 pulses after initiation of the irradiation as to make further irradiation impossible.

Effect of the Invention

As described above, in the synthetic quartz glass optical materials for use as optical members such as those constituting prisms and lenses of a laser-beam processing machine, the present invention provides a synthetic quartz glass optical material suitable for use in higher order harmonics of the third order or higher of YAG laser.

EXPLANATION OF THE REFERENCE NUMBERS

Figure 1:
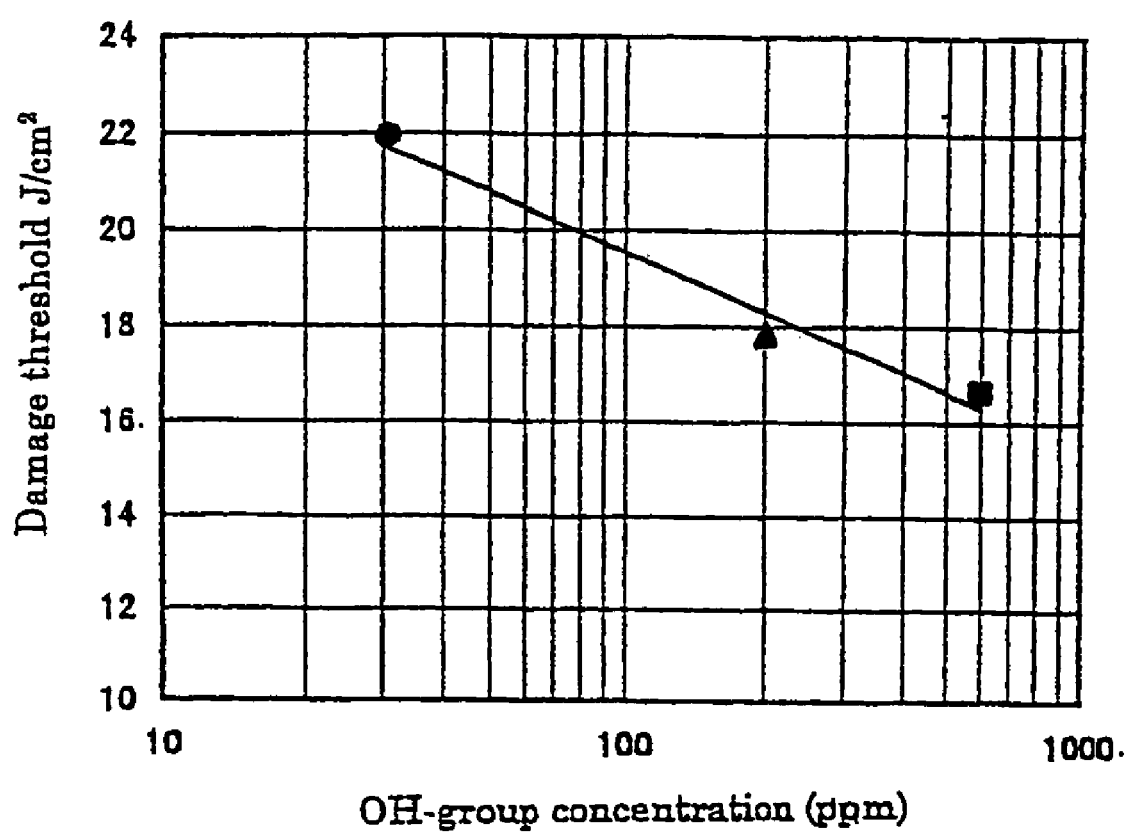
FIG. 1: This drawing is a graph that shows the correlation of the OH group concentration in Example 2 and 4, and Comparison Example 4, with the damage threshold value due to the single pulse irradiation of the YAG laser with third harmonic.
Figure 2:
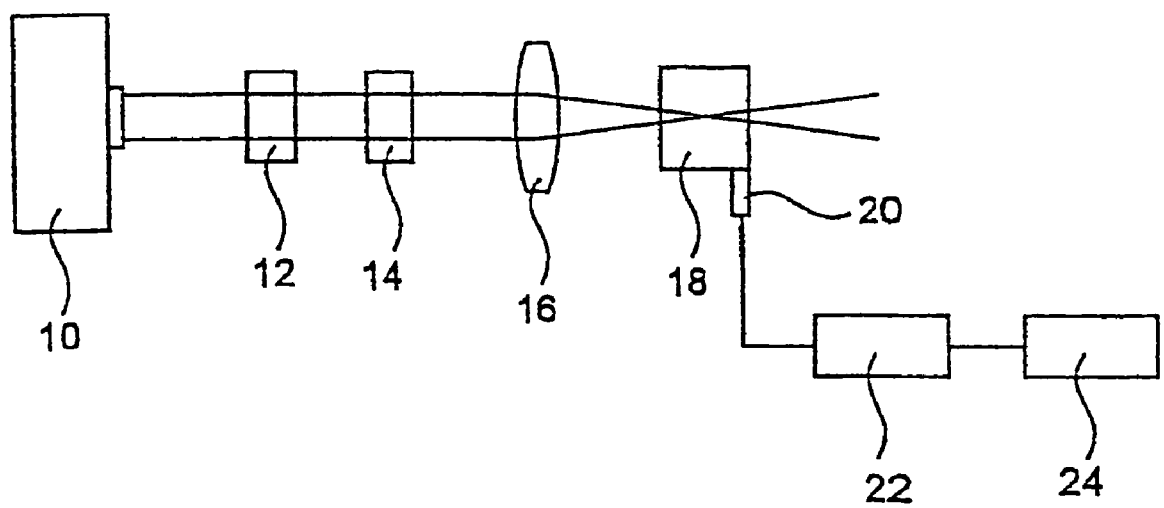
FIG. 2: This drawing is a rough illustration of a YAG laser damage testing apparatus.

10: YAG laser
12, 14: Wave transformation device
16: Lens
18: Sample
20: AE (acoustic emission) sensor
22: Amplifier
24: Oscilloscope

The invention claimed is:

1. A process for use of an optical part with a laser, said process comprising:
providing said optical part, said optical part being formed of a synthetic quartz glass optical material having an OH group concentration in a range of 5 to 30 ppm, a contained hydrogen molecule concentration in a range of $2\times10^{18}$ to $2\times10^{19}$ molecules/cm$^3$, and a transmittance of 99.9% or more of ultraviolet rays having a wavelength of 245 nm, wherein said synthetic quartz glass optical material is formed so as to have a fictive temperature in the range of 880 to 990° C.; and
irradiating said optical part with said laser, said laser being a higher harmonic YAG laser with a third or higher order of harmonic.

2. The process of claim 1, wherein said synthetic quartz glass optical material has a chlorine concentration contained therein of 20 ppm or less.

3. The process according to claim 1, wherein the hydrogen molecule concentration is in a range of $4\times10^{18}$ to $8\times10^{18}$ molecules/cm$^3$.

4. The process of claim 1, wherein the higher harmonic of the YAG laser is the third, fourth or fifth order.

5. The process of claim 1, wherein the YAG laser has an order of harmonic that is higher than the third order.

6. The process of claim 1, wherein said irradiating comprises irradiating the optical part with pulses, said pulses having a pulse width of 3 picoseconds to 5 nanoseconds and an oscillation frequency of 10 to 20 Hz.

7. The process of claim 6, wherein the higher harmonic of the YAG laser is the third order and said YAG laser has an energy density of 11 J/cm$^2$ or lower.

8. The process of claim 6, wherein the higher harmonic of the YAG laser is the fourth order and said YAG laser has an energy density of 2.5 J/cm$^2$ or lower.

9. The process of claim 1, wherein the synthetic glass material is formed by a method in which the material is heated and then cooled so as to have said fictive temperature in the range of 880 to 990° C.

10. The process of claim 9, wherein the synthetic glass material is cooled at a rate that is slow enough so as to cause said synthetic glass material to have said fictive temperature.

11. The process of claim 10, wherein the synthetic glass material is cooled at a rate of 2.0° C. per hour.

* * * * *